Nov. 17, 1953  J. J. PALMER  2,659,256
SPANNER TYPE STRAINER WRENCH
Filed Aug. 27, 1951
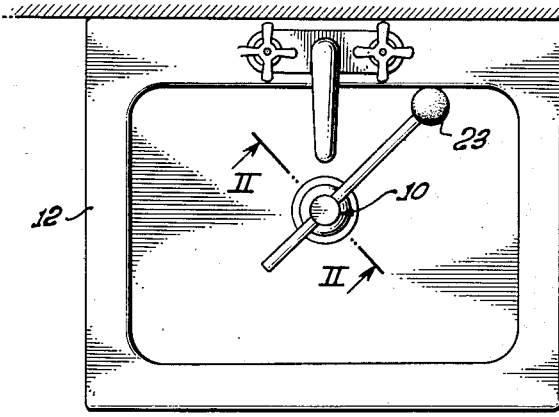
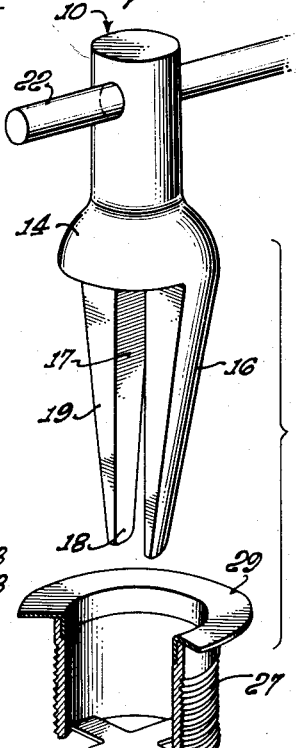
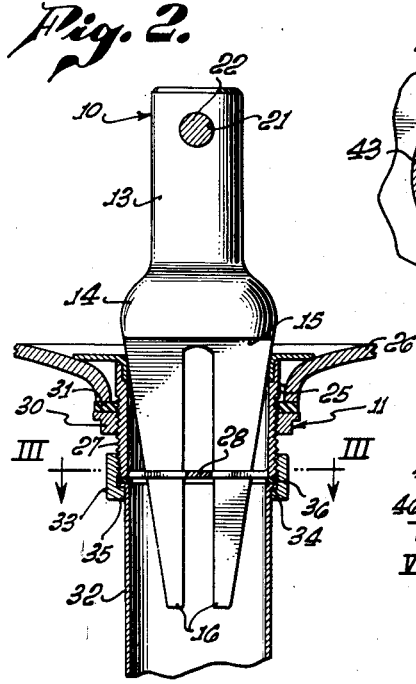
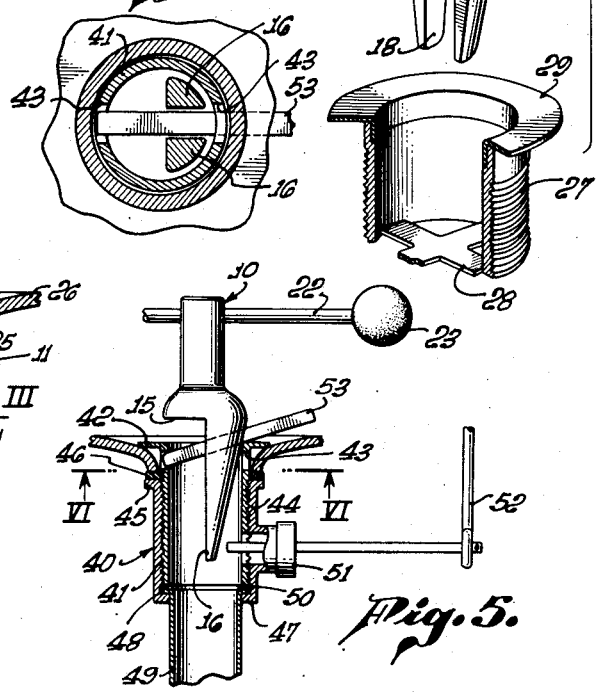
JOSEPH J. PALMER,
INVENTOR.
BY
ATTORNEY.

Patented Nov. 17, 1953

2,659,256

UNITED STATES PATENT OFFICE 2,659,256

SPANNER TYPE STRAINER WRENCH

Joseph J. Palmer, Arcadia, Calif.

Application August 27, 1951, Serial No. 243,873

3 Claims. (Cl. 81—90)

This invention relates to a plumbing tool and more particularly to a strainer wrench for facilitating installation of plumbing fixtures such as lavatories, bathtubs, utility basins, and the like.

The installation of plumbing fixtures such as those above mentioned presently requires the labor of at least two men. For example, when installing a lavatory fixture, a tight connection must be made between the fixture and a strainer pipe assembly which extends downwardly from the drain outlet of the lavatory fixture to a drain pipe. The connection is usually made by tightening a lock nut carried on the strainer assembly for compressing a resilient gasket between the nut and the edge of the drain outlet of the fixture. Because there is nothing to hold the strainer assembly against rotation, normally, a second plumber inserts a screw driver or end of a pliers into the web of the strainer pipe for holding it against rotation while the lock nut is tightened. Obviously the plumber tightening the lock nut is not in position to reach over and into the lavatory fixture for holding a tool which might grasp the strainer pipe, and the pipe cannot be held against rotation from beneath the fixture. As a result, it is customary to send out two plumbers to make such a relatively simple installation.

Some proposed plumbing tools have been designed to solve this problem but each of the plumbing tools known to me is limited to a particular type of fixture and is incapable of use on various types of strainer assemblies generally provided for such plumbing fixtures.

The prior proposed known tools are also incapable of adaptation to a pop-up type of strainer assembly wherein a vertically movable closure is provided with a depending portion operable within a strainer pipe. Such a strainer pipe has the web of the construction mentioned above omitted in order to permit the vertical movement of the pop-up closure.

Because of these disadvantages prior proposed plumbing tools designed for a strainer connection were not commercially successful and there is a present need for a strainer wrench virtually universally adaptable to the various types of plumbing fixtures.

The principal object of this invention, therefore, is to provide a strainer wrench for facilitating installation of plumbing equipment and fixtures such as lavatories, bathtubs, utility basins, and the like.

An object of this invention is to design and provide a strainer wrench which may be positioned to hold a strainer pipe assembly against rotation without injury or damage to the plumbing fixture while a connection is being made beneath the fixture between the strainer assembly and the drain outlet of the fixture.

Another object of this invention is to design and provide a strainer wrench for plumbing fixtures which is quickly, conveniently, and positively positioned for holding a strainer pipe assembly against rotation.

Another object of the invention is to design and provide a strainer wrench which is capable of use with either a pop-up type of drain outlet or a web type of drain outlet.

This invention contemplates a strainer wrench for plumbing installations wherein a shank is provided at one end with integrally formed depending tapered members or prongs having opposed parallel spaced inner flat faces defining a slot of uniform width for reception of a web portion in a strainer pipe assembly. Each member may be of sector-shaped cross section, both members lying to one side of a longitudinal plane passing through the axis of the shank. The other end of the shank is provided with a transverse port which slidably carries a transverse rod, said rod having a resilient yieldable ball or sphere at one end thereof for abutting contact with an internal surface of the fixture being installed to hold the wrench and strainer assembly against rotation. The slot defined by the two depending members is also adapted to accommodate and hold against lateral movement an elongated member of bar stock which may be inserted through said slot for engagement by one of its ends with an aperture normally provided in the top portion of a strainer pipe utilized with a pop-up type drain outlet.

Other objects and advantages of this invention will be readily apparent from the following description of the drawings.

In the drawings:

Fig. 1 is a top plan view of a lavatory fixture and a strainer wrench embodying this invention in operative position.

Fig. 2 is an enlarged fragmentary sectional view taken in a vertical plane indicated by line II—II of Fig. 1, a portion only of the wrench being shown in section.

Fig. 3 is a transverse horizontal section taken in the plane indicated by line III—III of Fig. 2.

Fig. 4 is an enlarged partially exploded perspective view of a strainer wrench embodying this invention and a cooperative port of a strainer assembly.

Fig. 5 is a fragmentary sectional view illustrating a strainer wrench embodying this invention utilized on a pop-up type drain outlet, the wrench being shown in side elevation.

Fig. 6 is an enlarged fragmentary sectional view taken in a horizontal transverse plane indicated by line VI—VI of Fig. 5.

In the drawings there is illustrated a strainer wrench, generally indicated at 10, embodying this invention as utilized in connection with a strainer assembly, generally indicated at 11, of a lavatory fixture 12. The strainer assembly 11 is illustrated as being one of well-known web type.

As best seen in Figures 2 and 4 strainer wrench 10 comprises an elongated shank 13 of uniform diameter. The lower end of the shank smoothly merges with an axially aligned generally enlarged spherical section 14 which terminates in a circular peripheral margin lying in a plane transverse to the axis of the shank. The section 14 may be provided with a downwardly facing virtually semi-circular transverse surface 15 and may have integrally formed therewith two depending spaced prongs or members 16 tapering from said section 14 to their extremity.

The spaced members 16 may be of sector-shaped cross-section, each member being provided with an inner flat first tapered face 17 lying in parallel relation to the corresponding face 17 of the other member. The spaced faces 17 define a slot 18 of uniform width. Each member 16 is also provided with a downwardly tapering flat second face 19 lying in angular relationship (shown in right angle relation) to the first flat face 17. The faces 19 of the members 16 may lie virtually in the same plane, said plane lying parallel to and in proximity to the axis of shank 13. Thus the members 16 are laterally offset from the axis of the shank 13. This arrangement facilitates proper positioning of the strainer wrench within a strainer assembly for transmission of turning forces substantially along the axis of the shank and without developing undesired stresses in the fixture.

The first inner face 17 and the second face 19 of each member are joined by a curved surface 20 which diminishes in radius along the length of each member 16 to its free end.

At the opposite end of shank 13 there may be provided a port 21 which slidably and adjustably accommodates a holding rod 2 of any suitable selected length. A resilient yieldable relatively soft rubber or rubber composition ball element 23 is carried at one end of rod 24 for pressure contact against an inner surface of lavatory fixture 12. The use of a yieldable material in ball element 23 prevents marring, scraping, or otherwise damaging the inner surface of the lavatory fixture.

As seen in Fig. 2, the strainer assembly 11 is mounted within a drain outlet 25 of a bottom concave well 26 of fixture 12. The assembly 11 may comprise an externally threaded strainer tube or pipe 27 having integrally formed therewith a transversely disposed cross or web 28 adjacent to its bottom end. The upper end of pipe 27 may be provided with an outwardly extending annular lip 29, the lower edge of which may bear against the top surface of well 26. The strainer pipe 27 is secured in water-tight relation to the drain of outlet 25 by means of a flanged lock nut 30 threaded thereon for compressing a resilient washer 31 against the downwardly facing edge of the outlet 25.

The lower end of strainer pipe 27 may usually be connected to the top end of a drain pipe 32 by a slip nut 33 having threaded engagement with strainer pipe 27. The drain pipe 32 is provided with a radially outwardly extending annular lip 34 having a lower surface for abutment with a radially inwardly extending lip 35 on slip nut 33. A resilient annular washer 36 may be compressed between the top surface of lip 34 and the bottom edge of the strainer pipe 27 by tightening of the slip nut 33.

When making the connection between the fixture and the drain pipe, the strainer assembly is first attached to the fixture in the drain outlet thereof.

In such an attachment, tightening of lock nut 30 to compress washer 31 may also cause rotation of the strainer assembly 11 inasmuch as there are no means for holding the strainer assembly against rotation with respect to the well 26 of the lavatory. In such an installation, a strainer wrench 10 embodying this invention may be quickly and easily positioned in the strainer assembly so that the spaced members 16 extend into openings 37 defined by web 28 and thus make a holding connection with the strainer assembly. The wrench 10 may be dropped into the strainer pipe with the spaced members down and will not only fall into engagement with the web but will also remain in upright position with the axis of the shank virtually in alignment with axis of the strainer pipe. The upright position is maintained because of the virtually semi-circular contact of the curved faces 20 on the members 16 with the top circular inner end edge of the strainer pipe. This contact limits the extent to which the wrench may be inserted in pipe 27. It should be noted that upon dropping the tool into the strainer pipe a slight wedging of the tapered members 16 into the strainer pipe occurs so that turning forces are resisted not only by the holding connection with the web but also by said wedging relation. The holding rod 22 is positioned transversely of shank 13 so that the yieldable element 23 will contact a side surface of the fixture 12 when the strainer assembly rotates as when the lock nut 30 is drawn tight. It is readily apparent that a second plumber is not required to hold the strainer assembly against rotation, and one plumber may freely work beneath the fixture for tightening the lock nut 30.

In Figs. 5 and 6 strainer wrench 10 is illustrated as being utilized with a strainer assembly of the pop-up type. In such a strainer assembly, generally indicated at 40, the web 28 is omitted to provide necessary space for a vertical movable strainer and closure (not shown).

The strainer assembly 40 comprises an externally threaded pipe section 41 having a radially outwardly lipped portion 42 and a plurality of spaced apertures 43 formed below the lip portion 42. The section 41 may be threaded within an internally threaded fitting 44, said fitting having a flange 45 at its top end for compressing a washer 46 against the bottom edge of the drain outlet of the fixture. The lower edge of fitting 44 is provided with an inwardly turned lip 47 which cooperates with an outwardly turned lip 48 on a drain pipe 49 for securing the assembly to the drain pipe. A resilient washer 50 may be provided between the lips 47 and 48. A side port 51 may be provided in the fitting 44 for passage therethrough and through an aligned opening in section 41 for the actuating linkage 52 of the pop-up type closure.

When strainer wrench 10 is employed with such a strainer assembly 40, members 16 may be inserted into the strainer pipe 41 after the vertically movable pop-up type closure has been removed. A relatively short bar 53 of any suitable stock may be passed through slot 18 until one end of the bar 53 is engaged within an aperture 43. Such engagement of the bar and strainer wrench with the strainer assembly 40 will hold the strainer assembly from turning when the yieldable element 23 is positioned in contact against an inner surface of the lavatory fixture 12.

It will thus be readily apparent to those skilled in the art that a strainer wrench is provided which virtually self-positions itself in holding relationship to a strainer assembly for resisting turning of the strainer assembly by transmission of said turning forces to the wall of the fixture. The shape of members 16 and their laterally offset relation to the axis of shank 13 provide a balanced tool in operation which will not slip with relation to the strainer assembly and which will remain in upright position when in cooperative engagement with the strainer assembly. The tapered construction of each member 16 in the laterally offset relationship as above described provides a strainer wrench which is capable of being utilized with any of the well-known standard strainer assemblies. Whether the web of the strainer comprises a single crossmember, two crossmembers arranged at right angles, or three crossmembers arranged at an angle of 120° to each other, the laterally offset spaced prongs will engage at least a portion of one of the crossmembers to make a holding connection. The taper of the prongs and the partially spherical section 14 give the wrench strength and enable the wrench to virtually self-position itself.

All changes and modifications of the strainer wrench described above which come within the scope of the appended claims are embraced thereby.

I claim:

1. A self-aligning strainer wrench for plumbing fixtures comprising: an elongated shank portion; an enlarged partially spherical section formed at one end of the shank portion and terminating in a circular peripheral margin lying in a plane transverse to the axis of the shank portion; two longitudinally extending members integrally formed with a virtually semi-circular portion of said section and lying to one side of a longitudinal plane passing through the axis of said shank, said members lying in spaced relation and having opposed flat parallel faces defining a slot adapted to receive therebetween a web portion of a strainer assembly, each member being of sector shaped cross-section diminishing in area from the circular peripheral margin of the spherical section towards its extremity; said members having curved surfaces adapted to contact end edges of a strainer pipe to align said wrench in upright position, the other end of the shank portion having a transverse port slidably receiving a holding rod, said holding rod carrying a yieldable element at one end for contact with a wall of a fixture for holding the wrench and strainer assembly against rotation.

2. A self-aligning strainer wrench for plumbing fixtures comprising: an elongated shank portion; an enlarged partially spherical section formed at one end of the shank portion and defining a circular peripheral margin concentric with the axis of the shank portion; spaced longitudinal extending members carried by a virtually semi-circular portion of said section and provided with spaced parallel opposed first tapered flat faces defining therebetween a slot, each member having a second tapered flat face annularly disposed to said first flat face, said second flat faces of said members lying in proximity to and on the same side of a plane passing through the axis of the shank portion and a curved surface merging with said first and second faces; said curved surfaces forming virtually a semi-circle and adapted to contact end edges of a strainer pipe to align said wrench in upright position, the other end of the shank portion having a transverse port slidably receiving a holding rod, said holding rod carrying a yieldable element at one end for contact with a wall of a fixture for holding the wrench and strainer assembly against rotation.

3. A self-aligning self-positioning strainer wrench for facilitating connection of a strainer assembly carried by a plumbing fixture to a drain comprising; a shank portion, one end of said shank portion carrying a wrench holding means to prevent turning of the wrench when operably positioned in a strainer assembly, the other end of said shank portion terminating in an enlarged section with a peripheral margin curved about the axis of the shank portion; a plurality of spaced adjacent longitudinally extending members integral with the enlarged section and extending parallel to the axis of the shank portion, each member being tapered from the enlarged section to its extremity, said tapering members having curved outer surfaces continuous with and smoothly merging with the peripheral margin of the enlarged section, said curved surfaces being adapted to contact in wedging relation an end edge of a strainer pipe for guiding and aligning the wrench in to upright position, and adjacent tapered members being adapted to receive therebetween a means associated with a strainer assembly for making a holding connection.

JOSEPH J. PALMER.

References Cited in the file of this patent

UNITED STATES PATENTS

| Number | Name | Date |
| --- | --- | --- |
| 1,293,865 | Mueller | Feb. 11, 1919 |
| 2,283,789 | Buckwalter | May 19, 1942 |
| 2,384,525 | Beverly | Sept. 11, 1945 |
| 2,397,574 | Thonet | Apr. 2, 1946 |
| 2,463,138 | Bamberg | Mar. 1, 1949 |